V. H. B. BARRINGTON-KENNETT.
Feed-Bag for Horses.
No. 228,537.                                    Patented June 8, 1880.
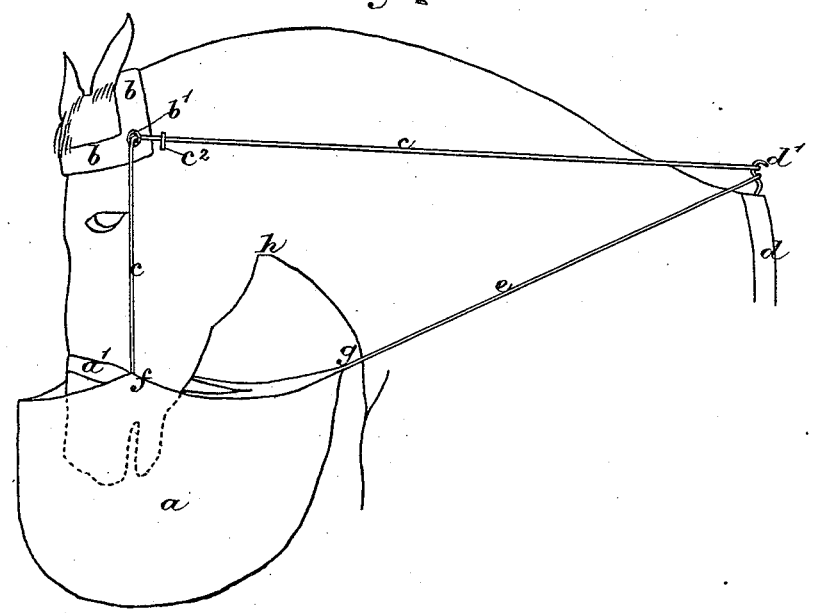
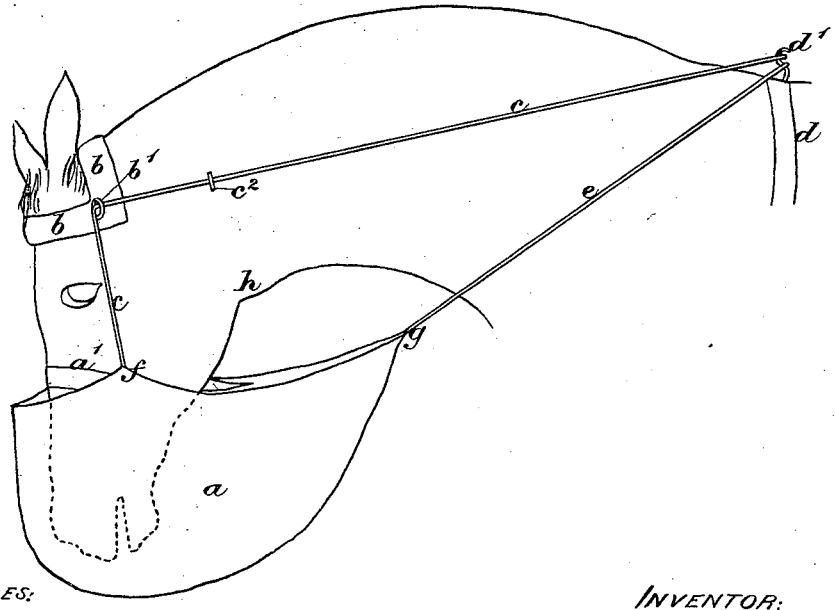

United States Patent Office.

VINCENT H. B. BARRINGTON-KENNETT, OF 15 HYDE PARK GARDENS, ENGLAND.

FEED-BAG FOR HORSES.

SPECIFICATION forming part of Letters Patent No. 228,537, dated June 8, 1880.

Application filed November 26, 1879. Patented in England May 2, 1879.

*To all whom it may concern:*

Be it known that I, VINCENT HUNTER BARRINGTON BARRINGTON-KENNETT, of 15 Hyde Park Gardens, in the county of Middlesex, England, barrister-at-law, have invented new and useful Improvements in Apparatus to be used in Feeding Horses and other Animals by Means of Nose-Bags, of which improvements the following is a specification.

This invention has for its object improvements in apparatus to be used in feeding horses and other animals by means of nose-bags.

My improvements relate to nose-bags of the class which are adapted to be so hung from the head of the animal and otherwise supported that the movements of the head and neck of the animal in feeding are to such extent imparted to the bag as to enable him to eat with comfort and without lowering his head to the ground or resting the bottom of the bag upon a support of some kind when the bag is partially emptied. The bag is so formed as to adapt it to be supported in the peculiar way to be described, belonging to that class in which the bag is of greater dimension from front to rear than across, or from side to side, and it is preferably made somewhat shallower than usual. From the front to, say, half-way to the back of the bag, which may be termed the "body portion," it is provided with an opening at top. This opening is preferably of about the size of, or perhaps a little larger than, the openings or diameters of the more usually employed nose-bags. The rear top part of the bag is covered, and the sides and bottom gradually converge from the front or body to the rear edge. At the extreme top and rear part the bottom and sides come to a point.

The suspending apparatus, as I prefer to construct it for use in connection with the bag, comprises a head-piece supporting two rings or eyes, one on either side of the head of the animal, near the base of the ear. Runners or pulleys may with advantage be provided in connection with or substitution of these rings or eyes, in order that the cords or straps which are passed through them may run the more freely. The bag has two cords or straps attached to its body or near the front, one on either side, and they pass up through the rings or pulleys, and are connected with a hook or fastening upon the saddle, collar, or girth.

A strap and buckle, or equivalent arrangement, may be provided to afford means of adjusting the length.

The cords or straps connected with the nose-bag have stops upon them between the rings or pulleys and the saddle, collar, or girth, of such a size as to be unable to pass through the rings or pulleys upon the head-piece. When the stops rest against the rings or pulleys the nose-bag is suspended in such a position that the muzzle of the animal is just entered into the mouth of the bag. The adjustment of the length of the cords or straps is such, also, that the stops thus rest against the rings or pulleys when the animal's head is raised and the neck somewhat arched. On the animal lowering his head and straightening his neck the stops are drawn back from the rings or pulleys, and, as well understood, the muzzle of the animal enters more deeply into the bag, the entire contents of which can thus be eaten in comfort.

In some cases I provide rings or pulleys on the ordinary harness to receive the cords or straps of the nose-bag. They may with advantage be made to open, so that the cords or straps may be passed in and out with facility.

Now, my improvements consist, as hereinafter more fully described, and then specifically claimed, in providing the bag, adapted to be suspended by its front or body part from the head of the animal, so as to be relatively lowered as the head is elevated and raised as the head is lowered, with straps or a pair of cords attached at their front ends to the rear upper part of the bag, and adapted to support the bag-extension or rear part of the bag in such manner that as the body or front part of the bag is raised the rear part will be stretched or drawn back, so that the feed will be caused to move forward to the mouth of the animal.

A bag constructed and suspended in this way will accommodate a larger amount of feed than the ordinary bag, and may be used for feeding hay, &c., as well as grain.

One great advantage of this form of bag and its supporting devices is, that the movements of the animal constantly change or renew the supply of feed at the point where it is taken into the mouth, as each time the head of the animal is lowered the feed from the rear part of the bag slides forward, the bag at such times being stretched back and its bottom inclined. When the head of the animal is lifted tension on the rear extension of the bag is relaxed, thus affording ample space for the admission of air for breathing.

In the accompanying drawings, Figure 1 is a side elevation of the apparatus as it appears when upon the horse. The position is that which the parts take when the bag is full. The horse then requires only to enter his muzzle into the mouth of the bag to be able to reach the contents and to eat. Fig. 2 is also a side elevation. It shows the position when the feed has been partially consumed, or the bag is nearly empty, and when the horse has to enter his head deeply into the bag to reach the food.

$a$ is the bag, and $b$ is a head-piece, which has attached to it at $b'$ $b'$ two rings or eyes, such that a cord will pass through them freely and without chafing. Metal rings will answer well; but, if desired, they may be fitted with rollers; or small swiveling pulleys may be provided, and the cords will then run more freely.

$c$ $c$ are easily-flexible cords attached to the body of the bag $a$ and passing through the rings or eyes $b'$, and so to the hook or attachment $d'$ upon the girth or saddle $d$. For the purpose of adjusting the length of the cords $c$, straps with buckles may be employed, or the cords may be adjusted at $d'$, or in the construction may be made of a length to suit the horse.

The arrangement may be varied by attaching the cords $c$ $c$ to the bottom of the bag, or some distance down the sides of the bag, after passing through a ring at the top $f$, in place of being attached to the bag at $f$. With this arrangement the head of the horse never has to be entered deeply into the bag, as the upper portion will gradually collapse as the bag gets empty.

$c^2$ $c^2$ are adjustable stops or knots on the cords $c$, of such a size as to be unable to pass through the rings or eyes $b'$, and when they rest against these rings or eyes they support the bag in the position in which it is seen in Fig. 1.

The end $g$ of the bag is attached by cords $e$ $e$ to the hook or attachment at $d'$, or other part of the harness, or round the animal's neck; or the cord $e$ may first pass through a ring or pulley fixed at the gullet of the horse $h$. The horizontal extension of the bag gives great capacity, and the fodder is gradually tilted forward as $g$ is relatively raised.

$a'$ is a band passing across the bag from side to side. It serves to keep the front of the bag away from the face of the horse, and so enables him to breathe with greater freedom.

The ends of the cords $c$ may be fixed at $f$ with hooks. When the bag is not in use the hooks will be attached to the bits.

I claim as of my own invention—

1. The combination of the head-piece $b$, the bag adjustably suspended or connected at its front or body portion with said head-piece and having the converging rear part or extension, and the cords or pair of straps secured at $g$ to said extension, substantially as and for the purpose hereinbefore set forth.

2. The combination of the bag formed with the front or body part and the rear portion extended, as shown, the ropes or straps $c$, and the ropes or straps $e$, adapted for use substantially as hereinbefore set forth.

VINCENT HUNTER BARRINGTON
BARRINGTON-KENNETT.

Witnesses:
JOHN DEAN,
W. RIMELL,
*Clerks to Messrs. Scorer & Harris, Notaries Public, 17 Gracechurch Street, London.*